United States Patent [19]

Crotwell

[11] Patent Number: 4,751,494

[45] Date of Patent: Jun. 14, 1988

[54] EMERGENCY FLASHER FOR MOTORIST IN DISTRESS

[76] Inventor: Ordie A. Crotwell, c/o Don Foley, 5346 Fruitland Farm Rd., San Angelo, Tex. 76903

[21] Appl. No.: 948,335

[22] Filed: Dec. 31, 1986

[51] Int. Cl.⁴ .............................................. B60Q 1/52
[52] U.S. Cl. ..................................... 340/107; 340/84; 40/592
[58] Field of Search ............... 340/84, 87, 107, 119, 340/138, 321; 40/591, 592, 546

[56] References Cited

U.S. PATENT DOCUMENTS

| | | | |
|---|---|---|---|
| 2,922,152 | 1/1960 | Del Conte | 340/84 X |
| 3,024,552 | 3/1962 | MacLea | 40/591 |
| 3,274,548 | 9/1966 | Brimsek | 340/84 |
| 3,810,092 | 5/1974 | Tucker | 340/107 |
| 3,924,344 | 12/1975 | Davis | 40/592 |
| 4,157,531 | 6/1979 | Mont | 340/107 |
| 4,373,282 | 2/1983 | Wragg | 40/546 |
| 4,430,638 | 2/1984 | Parker | 340/87 X |
| 4,489,306 | 12/1984 | Scolari | 340/107 |

Primary Examiner—Joseph A. Orsino
Assistant Examiner—Brian R. Tumm
Attorney, Agent, or Firm—Wendell Coffee

[57] ABSTRACT

A sign having a light with a flasher therein is stored beneath the seat of an automobile. If the motorist is in distress, the sign may be retrieved and plugged into the cigarette lighter of the automobile. Legs on the sign may be unfolded. With the window of the automobile rolled down, the motorist may place the sign on top of the automobile without unlocking the door of the automobile.

1 Claim, 2 Drawing Sheets

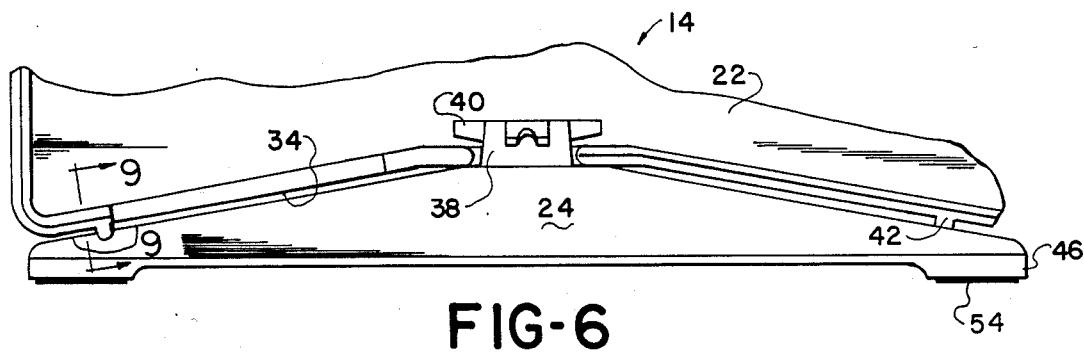
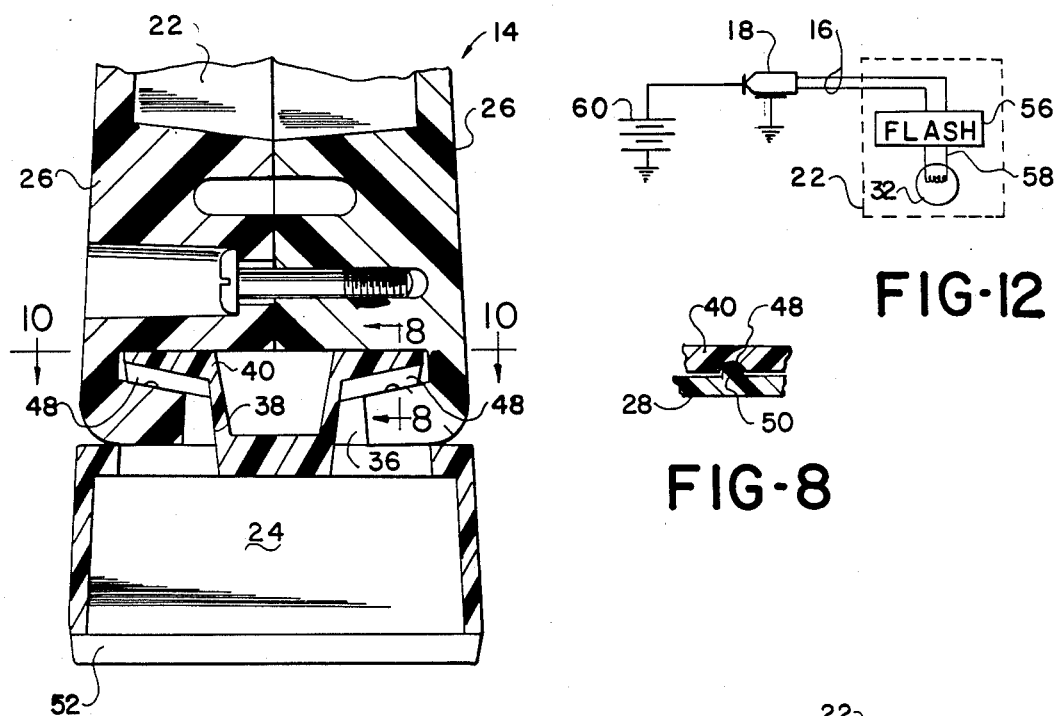
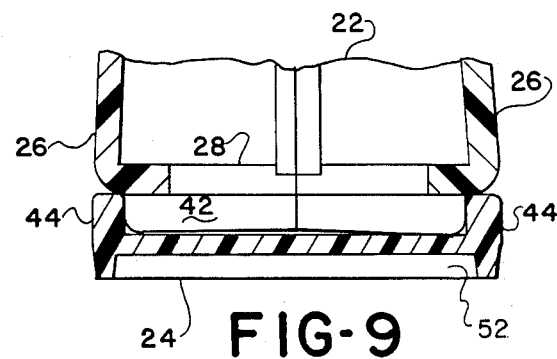

EMERGENCY FLASHER FOR MOTORIST IN DISTRESS

CROSS REFERENCE TO RELATED APPLICATION

None.

RIGHTS TO INVENTIONS UNDER FEDERAL RESEARCH

There was no federally sponsored research and development concerning this invention.

BACKGROUND OF THE INVENTION (1) Field of the Invention

This invention relates to signs to be placed on the top of an automobile, and more particularly, to a flashing sign indicating distress.

(2) Description of the Related Art

Before this application was filed, the applicant caused a search to be made in the U.S. Patent and Trademark Office. The following patents were found on that search:

DELCONTE, U.S. Pat. No. 2,922,152;
HANSEN, U.S. Pat. No. 3,298,122;
GRABOW, U.S. Pat. No. 3,507,245;
GRAY, U.S. Pat. No. 3,668,797;
ALSUP, U.S. Pat. No. 3,772,811;
DEXTER, U.S. Pat. No. 3,797,151;
TUCKER, U.S. Pat. No. 3,810,092;
DAVIS, U.S. Pat. No. 3,924,344;
SCOLARI, U.S. Pat. No. 4,489,306.

These patents are considered pertinent because the applicant believes the Examiner would consider anything revealed by an experienced patent searcher to be relevant and pertinent to the examination of this application.

SCOLARI discloses a sign to attach to the top of an automobile which is held in place by magnets on feet. The supporting feet of the sign fold outward. A flashing circuit is provided so that the message on the sign flashes.

DAVIS discloses an emergency sign to be placed upon the top of an automobile. The feet pivot outwardly.

DEXTER, ALSUP, and GRABOW disclose signs which may be magnetically attached to automobiles.

The remaining patents do not appear to Applicant to be as important as the ones identified above. However, these patents disclose various elements such as attachments for plugging the sign into the cigarette lighter of the automobile, or illuminated signs, or flashing road signs.

SUMMARY OF THE INVENTION (1) Progressive Contribution to the Art

This application discloses an improved method and a sign which plugs into the cigarette lgihter, flashes, and carries the message "CALL POLICE". Applicant believes that this is the best message to display on a vehicle in distress. Often times the motorist in a disabled automobile is in danger of molestation. If the sign is flashing "CALL POLICE", any person not having good intentions would be hesitant to molest the motorist for fear that the police may have already been called and might arrive momentarily.

Those having good intentions would realize that they can best help the motorist in distress by calling police. The police, having been called, can summon whatever additional services might be required, e.g. a towing vehicle or an ambulance.

The sign is designed to fold with the legs flat so it may be conveniently be carried under the driver's seat of an automobile. In this way, the motorist can retrieve the sign without leaving the car. Also, the motorist can roll down the window and place the sign on top of the car without opening, or even unlocking the door.

It is preferred to energize the sign by a cord from the cigarette lighter rather than batteries. The sign may be stored for long periods of time and still be immediately activated. If it were powered by self contained batteries, it is likely that the batteries would be dead when needed.

(2) Objects of this Invention

An object of this invention is to provide a flashing sign to be placed on top of an automobile by a motorist in distress.

Further objects are to achieve the above with a device that is sturdy, compact, durable, lightweight, simple, safe, efficient, versatile, ecologically compatible, energy conserving, reliable, and has long shelf life, yet is inexpensive and easy to manufacture, connect, adjust, operate and maintain.

Other objects are to achieve the above with a method that is rapid, versatile, ecologicaly compatible, energy conserving, efficient, and inexpensive, and does not require skilled people to connect, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 6 is an enlarged view of one of the panels of the invention (with some parts omitted for clarity) showing the legs in the folded position. This is a view as would be seen while the sign was being assembled.

FIG. 7 is a sectional view with the legs folded through the center of the spindle connecting the legs to the sign board.

FIG. 8 is a sectional view taken substantially on lines 8—8 of FIG. 7 showing the bottom of the cap.

FIG. 9 is a sectional view taken substantially along lines 9—9 of FIG. 6 showing the connection of the leg to the bar upon the bottom of the sign board.

FIG. 10 is a sectional view taken substantially along lines 10—10 of FIG. 7 showing the top of the cap of the spindle on the leg.

FIG. 12 is a schematic representation of the electrical connections of the invention.

Figure 1:
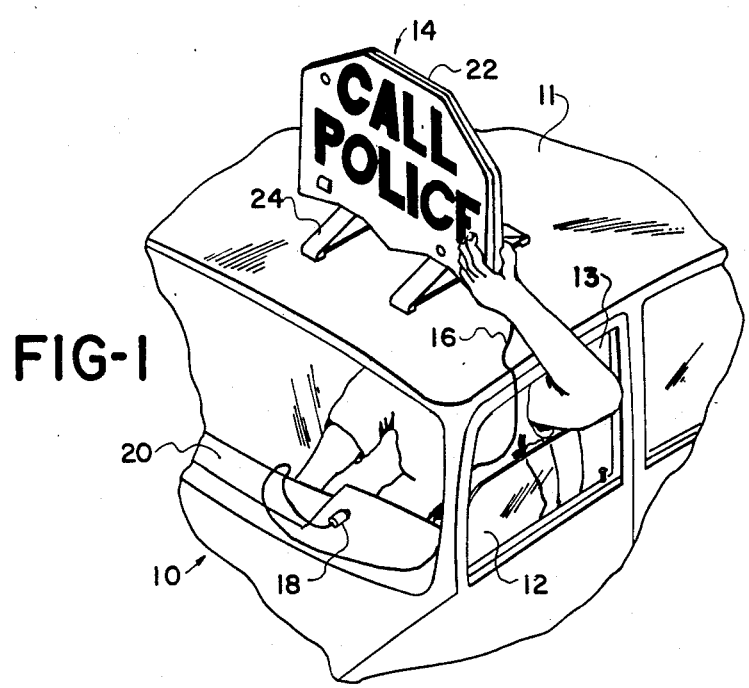
FIG. 1 is a perspective view of a portion of a vehicle carrying a motorist in distress with a sign according to this invention on top of the vehicle.

As an aid to correlating the terms of the claims to the exemplary drawing, the following catalog of elements and steps is provided:
- 10: automobile
- 11: top of automobile
- 12: window
- 13: passenger compartment
- 14: sign
- 16: cord
- 18: plug
- 20: dash
- 22: board
- 24: legs
- 26: panels
- 28: ledge
- 30: dimpled area
- 32: light bulb
- 34: indentation
- 36: semicircle
- 38: spindle
- 40: cap
- 42: bar
- 44: flanges
- 46: feet
- 48: indentation
- 50: nubs
- 52: recesses
- 54: means
- 56: flash
- 58: wiring
- 60: battery.

DESCRIPTION OF THE PREFERRED EMBODIMENT

Referring to the drawing, there may be seen a portion of an automobile 10. The automobile has passenger compartment 13 within it. A distressed motorist is shown within the passenger compartment with her arm extending from a lowered window 12. The sign 14 is shown being placed on the top 11 of the car by the distressed motorist.

Also, as seen in the drawing, electric cord 16 extends from the sign and terminates with plug 18. The plug is an electrical cigarette lighter plug, which is to say it is adapted to be inserted or plugged into the cigarette lighter universally found upon dash 20 within the passenger compartment 13 of automobiles 10.

Figure 4:
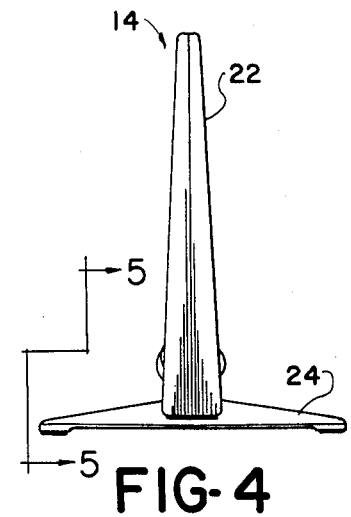
FIG. 4 is an end elevational view of the sign with the legs in the unfolded or extended position.
Figure 2:
FIG. 2 is a front elevational view of the sign with the legs in the flat or folded position.
Figure 5:
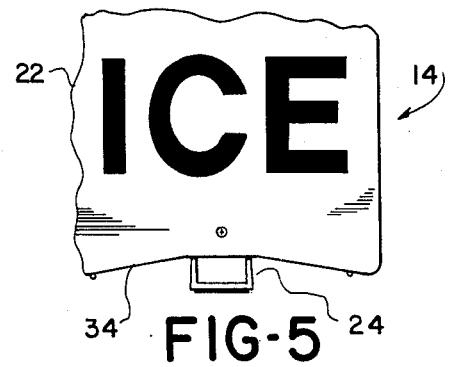
FIG. 5 is a partial elevational view taken substantially along lines 5—5 of FIG. 4 showing the leg extended.

The sign 14 has two major portions, board 22 and legs 24. As shown in FIGS. 2 and 4, the feet 24 are illustrated as being folded flat. Therefore, the sign 14 is normally carried conveniently within the passenger compartment 13 of the automobile 10 beneath the driver's seat so that it is readily available in emergency. FIGS. 1, 4, and 5 show the legs 24 in an unfolded or extended position. The legs are pivoted or rotated about a vertical axis. The term vertical is used when the sign 14 is in the display position, i.e., with the legs 24 at the bottom of the sign 14.

The board 22 of the sign 14 is made of translucent material. The board is split, thus having two panels 26, each panel being one-half of the board. When assembled, one panel would be on one side, and the other panel 26 is on the other side of a center plane. It is found desirable to make the two panels identical with each of the panels having a right and left end. The right and left ends of the panels are the mating portion of the panels. I.e., the right side of the first panel 26 mates with the left side of the second panel while the left side of the first panel mates with the right side of the second panel.

Each of the panels has an inward facing ledge 28 so that when the panels are fit together, they form the complete board 22 with an enclosed hollow portion bounded by the ledges 28 along the perimeter.

The upper portion of the panel 26 is dimpled, as seen in the area indicated by the numeral 30. The dimples are on the inside portion of the panel. An electric light bulb 32 is located within the hollow portion of the board 22 near the bottom and located about midway between the ends. The dimpling on the panels causes the board 22 to be illuminated more effectively. The dimpling is similar to that commonly used on automobile tail lights or running lights. The upper dimple part of each of the panels 26 will have the message "CALL POLICE" lettered thereon.

So that the light may shine upon the interior dimples of the panels 26, it is desired to have the panels tapered. I.e., to have the top having less thickness than the bottom. It has been found preferable to have each of the panels 26 of the board to have about a 3° taper. Therefore, if the panel is about 9" from top to bottom, the top will have a thickness of about ⅓ of the bottom. A suitable dimension for the thickness of the board 22 at the top is about 0.5", and a suitable dimension for the width of the board 22 at the bottom is about 1.5'. Also, a suitable width of the board would be about 15".

The bottom of the board 22 has an indention 34 on each end thereof. At the center of each indention, there is a circular hole. I.e., there is a semicircular hole 36 in each of the panels 26. Each of the legs 24 has a spindle 38 extending vertically upward from the center thereof. Cap 40 is on the top of each of the spindles 38. The spindle 38 extends through the circular hole formed by the semicircular holes 36 in the panels 26.

Figure 3:
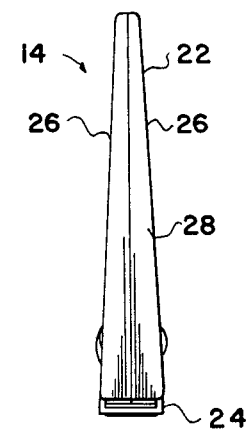
FIG. 3 is an end elevational view of the sign with the legs in the flat or folded position.
Figure 11:
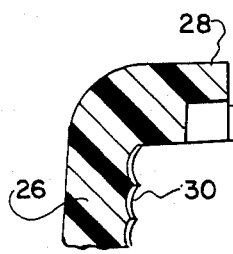
FIG. 11 is a sectional view taken substantially along lines 11—11 of FIG. 2 showing the dimpled part of the sign.

The legs 24 have the same width as the thickness of the board at its bottom. The top of the legs have the same shape as the indentations 34. I.e., the legs 24 when folded fit smoothly with the indentations 34 in the bottom of the board 22, as seen in FIGS. 2 and 3. Feet 46 at the ends of legs 24 have recesses therein. The recesses will have means 54 for holding the sign 14 to the top 11 of the automobile 10. These means may take the form of magnets. The preferred forms of means 54 for holding the sign onto the top of the automobile are sponge rubber pads.

Bars 42 are located near the outside portion of each of the indentations 34. Upward extending flanges 44 are on the top of the legs 24 on the outer side of each of the legs near the feet 46 on the legs. When the sign is folded flat, the bar 42 will be between the flanges 44 near the feet; and therefore, will hold the legs 24 in the folded position. Four indentations 48 are on the undersurface of the cap 40. Two of the indentations 48 will be aligned with the legs 24, and two of the indentations will be at right angles thereto. Nubs 50 extend upward on the interior of the board 22. One nub 50 is located upon each panel 26 and aligned with the semicircular opening 36. Therefore, in the folded position, the nubs 50 will be in alignment with the indentations 48 and will hold the legs in the folded position, i.e., they will aid the bars 42 within the flanges 44 of holding the legs in the folded position. When the legs 24 are rotated to the extended position where the legs are at right angles to the center plain of the board 22, the other indentations 48 will be aligned with the nubs 50 and hold the legs in the extended or unfolded position.

Flasher unit 56 is also within the board. The flasher unit is a means for energizing the electric light bulb 32 intermittently so that the sign 14 flashes. Electric wiring 58 connects the bulb 32 in the flasher 56. Electric cord 16 connects the wiring 58 to the plug 18; and thus, battery 60.

The embodiment shown and described above is only exemplary. I do not claim to have invented all the parts, elements or steps described. Various modifications can be made in the construction, material, arrangement, and operation, and still be within the scope of my invention.

The restrictive description and drawing of the specific examples above do not point out whan an infringement of this patent would be, but are to enable one skilled in the art to make and use the invention. The limits of the invention and the bounds of the patent protection are measured by and defined in the following claims.

I claim:

1. A sign to be placed on the top of a car by a motorist in distress comprising:
   a. a board made of translucent material,
   b. the board being split thus having two panels, each panel being one half a board, one on each side,
   c. an inward facing ledge on each of the panels so that when the two panels are fit together along a central plane, they form a complete board having an enclosed hollow portion bounded by the ledges along the perimeter,
   d. the upper part of each of the panels being dimpled,
   e. the upper dimpled part of each of the panels having the message "CALL POLICE" lettered thereon,
   f. the board being tapered from top to bottom,
   g. the board being about three times as wide at the bottom as at the top,
   h. each panel having a taper of about 3° from top to bottom,
   i. the bottom of the board having indentations on each end thereof,
   j. two folding legs, each being the same width as the bottom of the board,
   k. a central spindle extending from each leg,
   l. a cap on top of the spindle,
   m. each of said spindles extending through a hole in the center of the indentations on each end,
   n. bars near the outside portion of each indentation in the bottom of the board,
   o. upward extending flanges on the top of the legs at the outer side of each edge of the leg,
   p. said bars extending between the flanges to hold the legs in a folded position,
   q. indentation in the under surface of the cap,
   r. nubs extending upward on the interior of the board engaging said indentations in the under side of the caps so that when the legs are folded flat they are aligned with the board held in place by the bars between the flanges near the feet of the legs, and when they are rotated 90°, they are extending at right angles to the center plane of the board, and they are held in position by the engagement of the indentations on the bottom of the cap with the nubs on the interior of the board,
   s. an electric light bulb within the board,
   t. a flasher unit within the board,
   u. electrical wiring within the board connecting the bulb and flasher, and
   v. an electrical cord extending from the wiring within the board through the board perimeter to
   w. a plug,
   x. said plug being an electrical cigarette lighter plug.

* * * * *